US009609071B2

(12) United States Patent
Danzeisen et al.

(10) Patent No.: US 9,609,071 B2
(45) Date of Patent: *Mar. 28, 2017

(54) COMPUTER SYSTEM AND METHOD FOR DATA TRANSMISSION

(71) Applicant: Swisscom AG, Bern (CH)

(72) Inventors: Marc Danzeisen, Ittigen (CH); Marc Heissenbuttel, Bern (CH); Stefan Mauron, Meikirch (CH); Jan Linder, Bern (CH)

(73) Assignee: Swisscom AG, Bern (CH)

( * ) Notice: Subject to any disclaimer, the term of this patent is extended or adjusted under 35 U.S.C. 154(b) by 77 days.

This patent is subject to a terminal disclaimer.

(21) Appl. No.: 14/177,909

(22) Filed: Feb. 11, 2014

(65) Prior Publication Data
US 2014/0164473 A1 Jun. 12, 2014

Related U.S. Application Data

(63) Continuation of application No. 11/513,312, filed on Aug. 31, 2006, now Pat. No. 8,649,792.

(30) Foreign Application Priority Data

Sep. 8, 2005 (EP) ..................................... 05405529

(51) Int. Cl.
*H04W 72/00* (2009.01)
*H04L 29/08* (2006.01)

(52) U.S. Cl.
CPC ............ *H04L 67/18* (2013.01); *H04L 67/327* (2013.01); *H04L 69/329* (2013.01)

(58) Field of Classification Search
CPC ..... H04L 67/18; H04L 67/327; H04L 69/329; H04W 84/18; H04W 40/02;
(Continued)

(56) References Cited

U.S. PATENT DOCUMENTS 7,539,175 B2 5/2009 White et al.
2004/0199663 A1 10/2004 Horvitz et al.
(Continued)

FOREIGN PATENT DOCUMENTS

EP 1 530 342 5/2005
EP 1 530 342 A2 5/2005

OTHER PUBLICATIONS

European Search Report corresponding to European Patent Application No. 05 40 5529, mailed Jan. 24, 2006.

*Primary Examiner* — Shaima Q Aminzay
(74) *Attorney, Agent, or Firm* — McAndrews, Held & Malloy

(57) ABSTRACT

Methods and devices for data transmission may comprise a computer system comprising: a reception module configured to receive and store condition data assigned to data elements of a data delivery unit; a context checking module configured to check whether a second mobile communication terminal, external to the computer system, satisfies one or more conditions defined by the condition data; and a data transmission module configured to trigger transmission of context-specific data elements from the computer system via the mobile radio network to the first mobile communication terminal. The computer system may be configured to obtain, from a networking unit of the mobile radio network, current attribute data associated with the second mobile communication terminal, and the context checking module may be configured to check, based on these current attribute data and respective condition data, whether the second mobile communication terminal satisfies the conditions.

36 Claims, 4 Drawing Sheets

(58) Field of Classification Search
CPC . H04W 52/0216; H04W 80/00; H04W 40/22; H04W 40/26; H04W 40/28; H04W 52/0254
USPC ... 455/450, 3.06, 433, 414.1, 445, 557, 560; 370/236, 389; 709/223, 228
See application file for complete search history.

(56) References Cited

U.S. PATENT DOCUMENTS

| | | |
|---|---|---|
| 2004/0254998 A1 | 12/2004 | Horvitz |
| 2005/0101336 A1* | 5/2005 | Otsuka .................. G06F 21/10 455/456.3 |
| 2005/0165923 A1 | 7/2005 | Miyake et al. |
| 2005/0268335 A1 | 12/2005 | Le et al. |
| 2008/0139219 A1* | 6/2008 | Boeiro .................. G01S 19/48 455/456.2 |

* cited by examiner

COMPUTER SYSTEM AND METHOD FOR DATA TRANSMISSION

This application is a continuation of application Ser. No. 11/513,312, filed on Aug. 31, 2006, which claims priority to European Patent Application No. EP05405529 filed on Sep. 8, 2005. Each of these applications is hereby incorporated herein by reference in its entirety.

FIELD OF THE INVENTION

The present invention relates to a computer system and a method for data transmission. Specifically, the present invention relates to a computer system and a method for transmitting context-specific data via a mobile radio network to a mobile communication terminal.

BACKGROUND OF THE INVENTION

Frequent change of context is a characteristic inherent to mobile communication. Mobile communication terminals, such as mobile radio telephones, personal computers, or personal digital assistants (PDA) equipped for mobile communication via radio networks, change constantly their location within a communication network or move to other communication networks. For example, the mobile communication terminals visit a network operated by a foreign operator or access a wireless radio network via another access point. In addition to transitions within one or between multiple communication networks, mobile communication terminals also move between different peripheral devices, using different wireless interfaces for interacting with these peripheral devices, for example payment terminals, ticket terminals, access control devices, printers, scanners or computers, as well as between respective software applications. In these constant transitions, the mobile communication terminals are exposed continuously to a change of context, requiring that the mobile communication terminals operate context-specifically with different operational parameters and/or software elements, that the mobile communication terminals are provided with different cryptographic means and authorisations, and/or that the users of the mobile communication terminals are provided context-specifically with information.

Because, in view of the almost unlimited number of possible context changes, the storage space required for storing the context data elements would be very large, and because context-specific data elements need to be provided also to the mobile communication terminal for unforeseen or new context changes, respectively, it is advantageous to supply dynamically to the mobile communication terminal the context-specific data elements to be used during a context change.

In EP 1 530 342, described is a data transmission method in which data contents are delivered from a server to a mobile communication terminal. In addition, operating conditions assigned to the data contents are transmitted to the mobile communication terminal. The operating conditions determine a defined area within which the data contents are permitted to be forwarded. The mobile communication terminal determines its current position and forwards the data contents to another communication terminal, only if the current position is within the defined area.

According to US 2004/0199663, captured in a centralized server is information related to a user's client server interactions. This information is considered for forwarding messages. For example, this information includes the time of the last interaction, the current or past presence, or a predicted access time.

SUMMARY OF THE INVENTION

It is an object of the present invention to provide a computer system and a method, which make it possible to transmit dynamically context-specific data to a mobile communication terminal via a mobile radio network. In particular, it is an object of the present invention to provide a computer system and a method which make it possible to transmit dynamically context-specific data to a mobile communication terminal via a mobile radio network, the context-specific data making it possible to configure the mobile communication terminal for a change of context resulting from a transition to another communication network or from an interaction with a peripheral device, i.e. a device external to the mobile communication terminal. In particular, it is a further object of the present invention to provide a computer system and a method, which computer system and a method ensure that the context-specific data is transmitted only to an authorized mobile communication terminal that satisfies certain conditions.

According to the present invention, these objects are achieved particularly through the features of the independent claims. In addition, further advantageous embodiments follow from the dependent claims and the description.

According to the present invention, the above-mentioned objects are particularly achieved in that provided is a computer system for transmitting context-specific data via a mobile radio network to a first mobile communication terminal, condition data being received and stored in the computer system, which condition data is assigned to data elements of a data delivery unit. In addition, checked in the computer system is whether a second mobile communication terminal, external to the computer system, satisfies one or more conditions defined by the condition data. Finally, the computer system triggers transmission of context-specific data elements via the mobile radio network to the first mobile communication terminal, if the second mobile communication terminal satisfies at least one of the conditions. The context-specific data elements are assigned to condition data, which define a condition that is satisfied by the second mobile communication terminal. For example, the data elements comprise operational parameters for the first mobile communication terminal, an electronic message, an electronic data value, and/or a software element for a software application. By assigning condition data to data elements, defined are one or more conditions for delivering the respective data elements. If a mobile communication terminal satisfies one or more of the conditions defined by the condition data, a specific context exists for the respective mobile communication terminal. For adapting the mobile communication terminal to the new specific context, delivered to the mobile communication terminal as context-specific data are the data elements assigned to the respective condition data. By transmitting and storing the condition data to or in the computer system, context monitoring for the mobile communication terminals is removed to a dedicated computer. Hence, this task does not need to be performed by a data delivery unit, for example, thereby simplified is the implementation of multiple independent and distributed data delivery units. Context monitoring by the computer system and context-specific data transmission triggered by the computer system make it possible to supply automatically context specific data elements to mobile communication terminals, without having to burden the mobile communication terminals with functions for context monitoring and context recognition, and without having to store context rules in the mobile communication terminals. At the same time, the condition-restricted data transmission makes it possible to transmit the data elements to only one, or to multiple authorized mobile communication terminals, which satisfy the specific conditions.

In different embodiments, the first mobile communication terminal and the second mobile communication terminal are two separate mobile communication terminals, or the first mobile communication terminal and the second mobile communication terminal are one and the same mobile communication terminal. This means, in the first variant, the context-specific data are transmitted to a first mobile communication terminal on the basis of conditions that are satisfied by another second mobile communication terminal, whereas in the latter variant, the context-specific data are transmitted to the same mobile communication terminal, which also satisfied the conditions.

In a preferred embodiment, the computer system is configured to check, based on current attribute data associated with the second mobile communication terminal and respective condition data, whether the second mobile communication terminal satisfies the condition(s) defined by the conditions data. For example, the current attribute data comprise data related to the current geographic position of the mobile communication terminal, the network access point currently used, the network identifier, the network address and/or the network type of the current network, the subscriber identifier, a specific certificate and/or password, and/or the device type and device configuration of the mobile communication terminal. Preferably, the computer system is configured to obtain from a networking unit of the mobile radio network the current attribute data associated with the second mobile communication terminal. In that the computer system is configured to access a networking unit of the mobile radio network, for example a home location register (HLR) or a visitors location register (VLR), and to obtain current attribute data related to mobile communication terminals, it is possible for the computer system to use as the basis for context assessment subscriber-specific or terminal-specific attribute data, respectively, from the mobile radio network or from the operator of the mobile radio network, respectively. If the computer system is implemented advantageously in the network infrastructure of the operator of the mobile radio network, it is possible to use efficiently for context monitoring subscriber-specific or terminal-specific attribute data, respectively, that are internal to the network, without these sensitive attribute data having to be transmitted via communication links to external units, for example the data delivery unit. In an embodiment, the attribute date further comprise user attribute data, e.g. user profiles, user subscriptions, or current biometric values of the user such as blood pressure, body temperature or pulse frequency of the user. Typically, the user attribute data are provided by the mobile communication terminal or by an associated measuring unit.

In an embodiment, the computer system is configured to receive from the second mobile communication terminal a confirmation of condition compliance, for example an encrypted confirmation, to check the confirmation of condition compliance, for example by decrypting the confirmation, to determine condition data assigned to the confirmation of condition compliance, and to trigger the transmission via the mobile radio network to the first mobile communication terminal of the context-specific data elements assigned to the condition data determined. Triggering the data transmission on the basis of a received confirmation of condition compliance makes possible the conditional data transmission to mobile communication terminals or other devices that are not accessible to the computer system for condition checking. In the inaccessible mobile communication terminal or in the inaccessible device, checked is the compliance with a condition defined by the condition data, and a confirmation of condition compliance is generated and transmitted via the second mobile communication terminal to the computer system. For example, the confirmation of condition compliance is transmitted by the device via a device interface, e.g. Bluetooth, to the second mobile communication terminal. In other words, it is possible to execute quasi an "off-line" conditions check.

In an embodiment, the computer system is configured to receive from the data delivery unit data elements assigned to the condition data and to store the data elements assigned to the condition data. The computer system is further configured to transmit the context-specific data elements to the first mobile communication terminal. This variant makes it possible for a data delivery unit to remove to the computer system not only the context monitoring but also the actual delivery of the context-specific data. Thereby, during the delivery of the context-specific data, there is no need for an exchange of data between the computer system and the data delivery unit (which would delay the delivery).

In an embodiment, the computer system is configured to receive and store assignment data, which assign the condition data to the data elements of the data delivery unit. The computer system is further configured to trigger the transmission of the context-specific data elements by transmitting to the data delivery unit a release instruction. This variant, implemented as an alternative or a complement to the variant above, makes possible a clear separation of the tasks of the computer system, performing the context monitoring, and the data delivery unit, transmitting the context-specific data to the mobile communication terminal. This variant has the advantage that it enables the computer system to be relieved from having to store context-specific data.

In an embodiment, the computer system is configured to receive and store instructions, which are assigned to the condition data and/or the context-specific data elements. The computer system is further configured to trigger the transmission of the context-specific data elements according to the respective instructions, whereby different ones of the context-specific data elements are to be transmitted to the first mobile communication terminal and/or to another device. The possibility of assigning instructions to the condition data and/or the context-specific data elements enables the flexible specification of the delivery of the context-specific data to one or more receivers. For example, the data elements comprise operational parameters for a device as well as a cryptographic key pair assigned to the operational parameters. According to the instructions, the computer system triggers, for example, the transmission of the operational parameters as well as one of the assigned cryptographic keys to the device, and the transmission of one of the assigned cryptographic keys to the first mobile communication device. By delivering the keys of a context-specific key pair to the mobile communication terminal and to the further device, it is possible to control access from the mobile communication terminal to this device on the basis of the keys. Moreover, by means of the operational parameters, it is possible to adapt the device in a context-specific way to the interaction with the mobile communication terminal.

In an embodiment, the computer system is configured to check periodically or on the basis of a received message the condition(s) defined by the condition data. For example, the message is transmitted or initiated, respectively, by the second mobile communication terminal, by a networking unit of the telecommunications network, or by the computer system.

In different embodiments, the data delivery unit is arranged external to the computer system or directly in the computer system.

In addition to a method and a computer system for transmitting context-specific data via a mobile radio network to a first mobile communication terminal, the present invention also relates to a computer program product including computer program code means for controlling one or more processors of a computer such that the computer executes the method; particularly, a computer program product including a computer readable medium containing therein the computer program code means.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
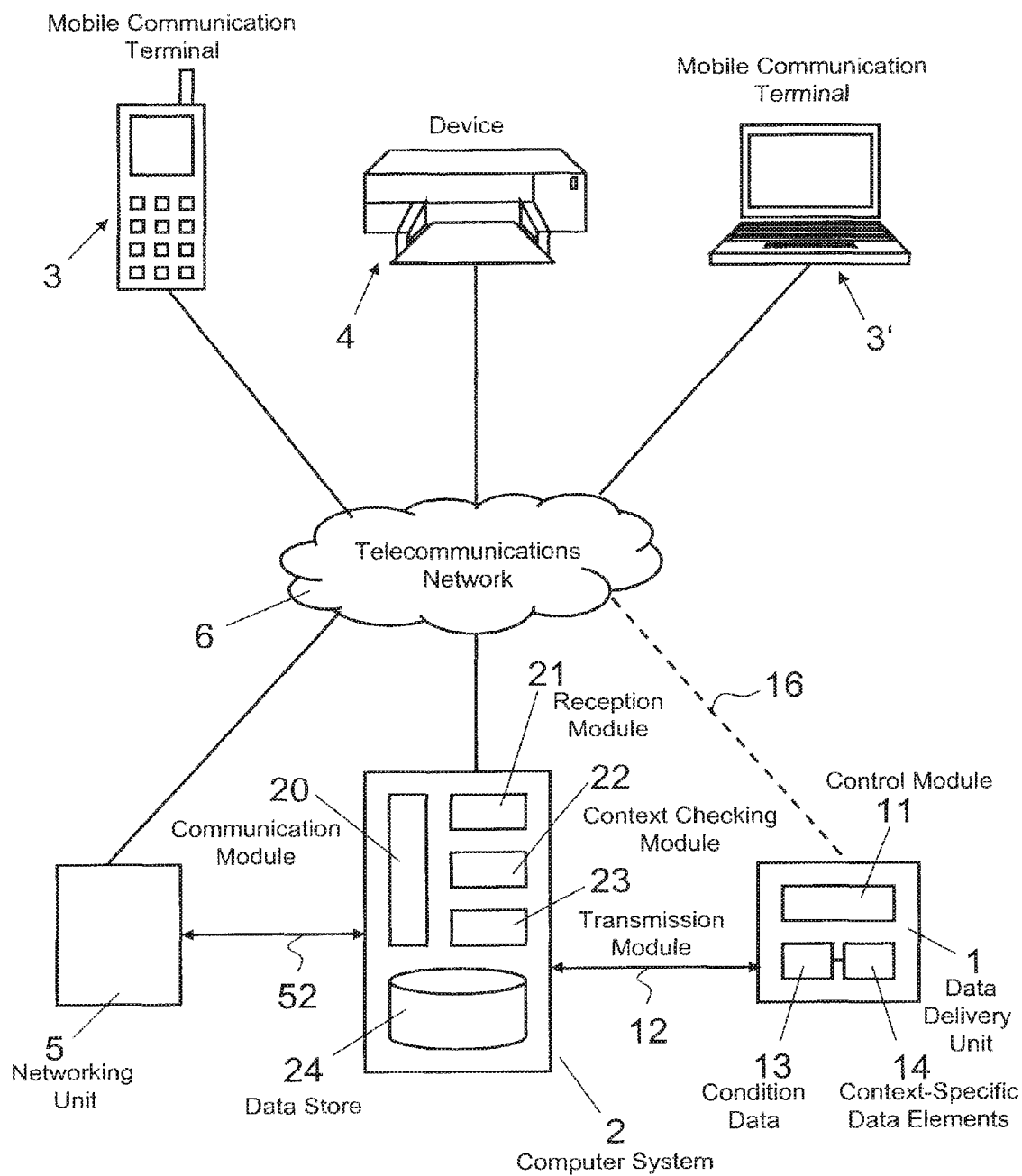
FIG. 1 shows a block diagram illustrating schematically a computer system connected to a data delivery unit and, via a telecommunications network, to communication terminals.

In FIG. 1, reference numeral 6 relates to a telecommunications network comprising, in particular, a mobile radio network. For example, the mobile radio network is a GSM-network (Global System for Mobile Communication), a UMTS-network (Universal Mobile Telephone System) or another, for example satellite-based, mobile radio network, or a WLAN (Wireless Local Area Network). In an embodiment, the telecommunications network 6 comprises also a fixed network, for example the public switched network, an ISDN-network (Integrated Services Digital Network), a digital subscriber line (DSL), ad-hoc networks, multi-hop networks, peer-to-peer-networks, hybrid networks, and/or preferably the Internet or an Intranet.

In FIGS. 1, 2a, 2b, 3a, 3b, reference numeral 3, 3' relates to mobile communication terminals, configured for communication vie the above-mentioned mobile radio network, for example a mobile radio phone or a PDA computer (Personal Digital Assistant) or a mobile notebook or laptop computer.

In FIGS. 1, 2a, 2b, 3a, 3b, reference numeral 4 relates to a computerized device, for example a printer, a scanner, a payment terminal, a ticket terminal, an access control device, or a common computer. Typically, device 4 is equipped with function-specific software applications and provided with a communication module for the data communication via telecommunications network 6.

In FIG. 1, reference numeral 5 relates to a networking unit of telecommunications network 6; particularly, a networking unit 5 of the mobile radio network in which stored are subscriber-specific or terminal-specific attribute data, respectively, from subscribers or mobile communication terminals 3, 3' of the mobile radio network, respectively. Preferably, the networking unit 5 is part of the infrastructure of the mobile radio network and it is operated by the operator of the mobile radio network. For example, the networking unit 5 comprises a so called Home Location Register (HLR) or Home Subscriber System (HSS), i.e. a home subscribers data base, a so called Home Agent (HA) for Mobile IP (MIP), and/or a so called Visitor Location Register (VLR), i.e. a visitors data base.

In FIGS. 1, 2a, 2b, 3a, 3b, reference numeral 2 relates to a computer system, which is provided with a communication module 20 for the data exchange via telecommunications network 6. The computer system 2 is implemented preferably as a server. Preferably, the computer system 2 is connected via a communication link 52 with communication unit 5 and operated by the operator of the mobile radio network or by another so called Trusted Third Party (TTP), for example Certificate Authority, a government or an enterprise. Communication module 20 is also configured to access data in the networking unit 5 via communication link 52. Computer system 2 comprises one or more computers, each having one or more processors. For controlling the processors, computer system 2 further comprises various functional modules, particularly a reception module 21, a context checking module 22, and a data transmission module 23. Preferably, the functional modules are implemented as programmed software modules. The computer program code of the software modules is part of a computer program product and is stored preferably in a computer of computer system 2, on a computer-readable data carrier connected fixed or removably with the computer. One skilled in the art will understand that the functional modules can be implemented partly or fully by means of hardware. Furthermore, computer system 2 comprises a data store 24 for storing condition data and associated context-specific data elements, as will be explained later in more detail. The communication module 20 is further configured to communicate with the data delivery unit 1 via a communication link 12.

Preferably, the data delivery unit 1 is configured as a computerized device and implemented on a computer separate from computer system 2, the communication link 12 being configured accordingly as a fixed communication link. As indicated through the dashed line 16, in an embodiment, the data delivery unit 1 further comprises a communication module for communicating via telecommunications network 6. In a variant, the data delivery unit 1 is implemented as a (mobile or fixed) communication terminal, configured to communicate with computer system 2 via telecommunications network 6. One skilled in the art will understand, however, that the data delivery unit can also be implemented as a programmed software on one of the computers of computer system 2, the communication link 12 being implemented accordingly as a software interface. The data delivery unit 1 comprises a control module 11, implemented as a programmed software module, as well as stored condition data 13 and assigned context-specific data elements 14. The data delivery unit 1 can also be distributed across multiple computers; particularly, the condition data 13 and the assigned context-specific data elements 14 being stored on separate units and being transmitted from these units.

Figure 4:
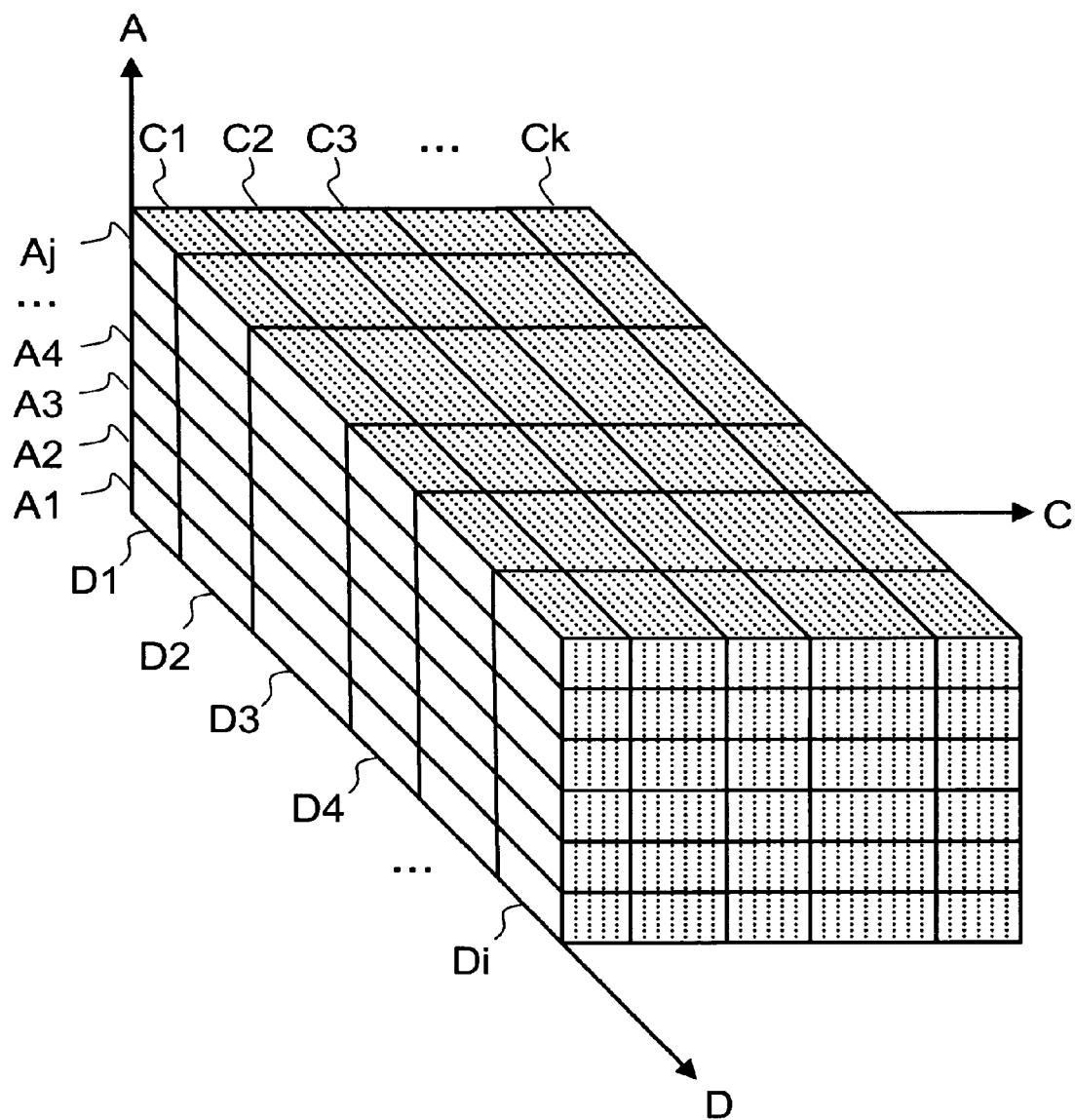
FIG. 4 shows an overview illustrating the interrelation between context specific data, context-defining conditions, and attribute data.

The condition data 13 define conditions (criteria) for current attributes of communication terminals or communication participants of the telecommunications network 6, respectively, particularly of the above-referenced mobile radio network. Assigned to one or more of the context-specific data elements 14 are one condition, or one or more combinations of multiple conditions defined by the condition data 13. The conditions define a specific context for the assigned context-specific data elements 14. The context-specific data elements 14 are delivered only, if the associated conditions(s) is/are satisfied concurrently, i.e. if the respective context is given. In FIG. 4, illustrated schematically is the interrelation between context-defining conditions, on axis C, attributes, on axis A, and context specific data elements, on axis D. One or a combination of more than one of the condition data elements define a condition C1, C2, C3, Ck for one or more than one attributes A1, A2, A3, A4, Aj. One or more than one data elements D1, D2, D3, D4, . . . , Di are assigned to each of the conditions C1, C2, C3, Ck. The conditions C1, C2, C3, Ck define for the attributes A1, A2, A3, A4, Aj specific values, minimum values or value ranges, or define a specific mutual value relationship for multiple attributes A1, A2, A3, A4, Aj (among each other). Location conditions require, for example, that the subscriber or the mobile communication terminal 3, 3', respectively, is located at a specific geographic position or in a specific area. Network conditions require, for example, that the mobile communication terminal 3, 3' is registered in a specific network, uses a specific access point or network address, or uses a specific communications protocol or a defined minimum bandwidth. Time conditions define a specific time range or point in time as a requirement. Device conditions require a specific or at least a minimum device specification and or device configuration, for example a minimum resolution of a display, a minimum size of available memory space, current virus scanners, firewalls, etc. Using the condition data, it is also possible to define the condition that the mobile communication terminal 3, 3' is authenticated and authorized, i.e. that a respective process has been carried out.

For example attributes A1, A2, A3, A4, Aj comprise the current geographic position of a subscriber or his mobile communication terminal 3, 3', the access point to a WLAN currently used by the mobile communication terminal 3, 3', the network identifier and/or the network type of the network in which the mobile communication terminal 3, 3' is currently located, the current network address (MAC, IP) or care of address (e.g. in Mobile IP, MIP) currently assigned to the mobile communication terminal 3, 3'), a protocol currently used by the mobile communication terminal 3, 3', e.g. GPRS (General Packet Radio Service) or UMTS (Universal Mobile Telecommunications System), the subscriber identifier of the subscriber, a certificate stored in the mobile communication terminal 3, 3', or a subscriber identification module (e.g. SIM, Subscriber Identification Module; USIM, SIM for UMTS; or ISIM, IP Multimedia Service Identity Module) implemented as a chipcard (smartcard), for example, a password provided by the subscriber or the mobile communication terminal 3, 3', the device type, the device configuration of the mobile communication terminal 3, 3', e.g. display resolution and/or display size, service subscriptions and authorizations of the subscriber, and/or data related to the current point in time (time of day, calendar date).

Preferably, the context-specific data elements D1, D2, D3, D4, . . . , Di comprise operational parameters for the mobile communication terminal 3, 3' or device 4, respectively. Preferably, the operational parameters for the mobile communication terminal 3, 3' or device 4, respectively, which are contained in the context-specific data elements D1, D2, D3, D4, . . . , Di, comprise parameters and data values related to communications technology for the different layers one to seven defined in the ISO/OSI Reference Model (International Standards Organisation, Open System Interconnection) and include application-specific values. Data elements for layer one (physical layer) comprise, for example, parameters for the configuration of the radio interface, modulation type and carrier frequency (e.g. for SDR, Software Defined Radios). Data elements for layer two (link layer) comprise, for example, WEP keys (Wired Equivalent Privacy) or other cryptographic security or authentication keys for layer two, FEC-Codes (Forward Error Correction) or SSIDs (Service Set Identifier). Data elements for layer three (network layer) comprise, for example, IP addresses (Internet Protocol), network masks, so called security credentials (e.g. password or X.509-certificate) e.g. for IPsec (IP Security), gateway addresses, or data related to neighbouring mobile communication terminals with which a direct P2P-connection (point to point) can be established, without using the network infrastructure. Data elements for layer four to seven (transport, session, presentation and application layers) comprise, for example, Codecs (Coder/Decoder) for multimedia information, further security credentials, e.g. for SSL (Secure Sockets Layer), or certificates, configurations for firewalls, setup parameters for peripheral devices 4, e.g. printer settings or authorisations such as an authorization ticket for printing a defined number of pages. The context-specific data elements D1, D2, D3, D4, . . . , Di also comprise user information such as telephone numbers, location-specific data, routing information, or other electronic messages. In a variant, the context-specific data elements D1, D2, D3, D4, . . . , Di also comprise software elements for software applications of the mobile communication terminal 3, 3' or device 4, respectively, for example so called application-specific plugins.

In the following paragraphs, with reference to FIGS. 2a, 2b, 3a and 3b, described are different examples of the sequence of method and data exchange for transmitting context-specific data from the data delivery unit 1 to a communication device.

Figure 2A:
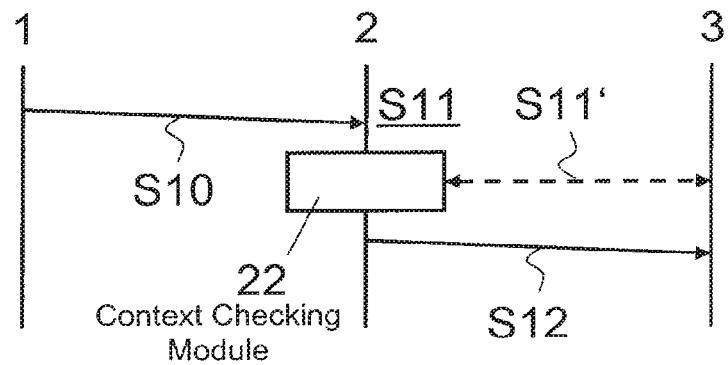
FIG. 2a shows a flow chart illustrating schematically a possible data exchange during the transmission of context specific data from the data delivery unit to a mobile communication terminal.
Figure 2B:
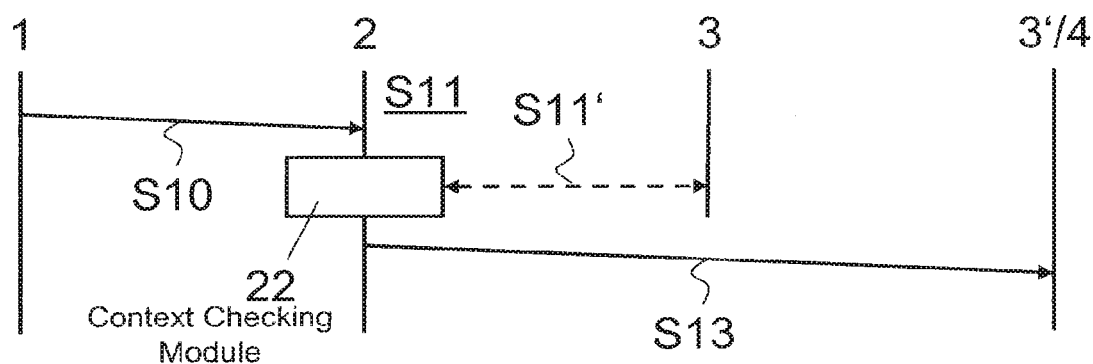
FIG. 2b shows a flow chart illustrating schematically a possible data exchange during the transmission of context specific data from the data delivery unit to a communication terminal.

As illustrated in FIGS. 2a and 2b, in step S10, the data delivery unit 1 transmits via the communications link 12 to computer system 2 condition data and associated context-specific data elements. The condition data and associated data elements are received in computer system 2 by the reception module 21 and stored in data store 24. Typically, the condition data are subscriber-specific or group-specific; however, the condition data can also be valid and applicable for all subscribers or mobile communication terminals 3, 3', respectively, in the respective mobile radio network. In step S10, together with the condition data and context-specific data elements, the data delivery unit 1 can also transmit associated instructions to the computer system 2. The instructions and respective instruction parameters are received by the reception module 21 and stored in data store 24 assigned to the condition data and/or the context-specific data elements. In subsequent paragraphs, examples of instructions will be given.

In step S11, the context checking module 22 checks whether the mobile communication terminal 3 satisfies one or more conditions, defined by the condition data and relevant for the mobile communication terminal 3. The context checking module 22 executes the context check periodically or upon occurrence of certain events relevant for the mobile communication terminal 3. For example, the relevant events include reception of a message transmitted or initiated by the mobile communication terminal 3, for example a so called Location Update message in the HLR from the mobile communication terminal 3, a so called Binding Update (BU) at the Home Agent (HA) when using Mobile IP, or a so called UPDATE_SA_ADDRESSES message in the Internet Key Exchange Protocol (IKEv2). The message can also be transmitted or initiated by a networking unit 5 of telecommunications network 6 or by the computer system 2. The context check includes accessing the networking unit 5, if the condition data are related to attributes that are stored at the networking unit 5 as subscriber-specific data. As indicated in step S11', the context check can also include data requests to the mobile communication terminal 3, if the current attributes to be examined are not available at the networking unit 5. If at least one condition is satisfied that is associated with context-specific data elements that need to be transmitted, computer system 2 proceeds in step S12, according to the embodiment illustrated in FIG. 2a, or in step S13, according to the embodiment illustrated in FIG. 2b, respectively. Otherwise, if no condition is satisfied, the context checking module 22 awaits the next checking period or the next event triggering the check.

In step S12 (FIG. 2a), the data transmission module 23 transmits the context-specific data elements, assigned to the satisfied conditions determined in step S11, via the mobile radio network to the mobile communication terminal 3 that satisfied the condition.

In step S13 (FIG. 2b), the data transmission module 23 does not transmit the context-specific data elements, assigned to the satisfied conditions determined in step S11, via the mobile radio network to the mobile communication terminal 3 that satisfied the condition, but to the mobile communication terminal 3' or to device 4, which were specified as recipients in an instruction stored assigned to the respective conditions and/or the context-specific data elements.

Provided also are instructions for delivering the context-specific data elements to multiple specified recipients, for example to the mobile communication terminal 3 that satisfied the conditions and to the mobile communication terminal 3' and/or device 4. According to such instructions, step S12 as well as step S13 are executed. The instructions can also be configured such that different context-specific data elements are delivered to different recipients. For example, in step S12, a first cryptographic key of a key pair is transmitted to the mobile communication terminal 3 that satisfied the conditions, and, in step S13, the second key along with further context-specific data elements, e.g. setup parameters for a printer, is transmitted to device 4. Subsequently, based on the key pair, checked is the authorization of the mobile communication terminal 3 for accessing the printer, and, using the printer setup parameters received, executed by the printer is a printing task from the mobile communication terminal 3.

Figure 3A:
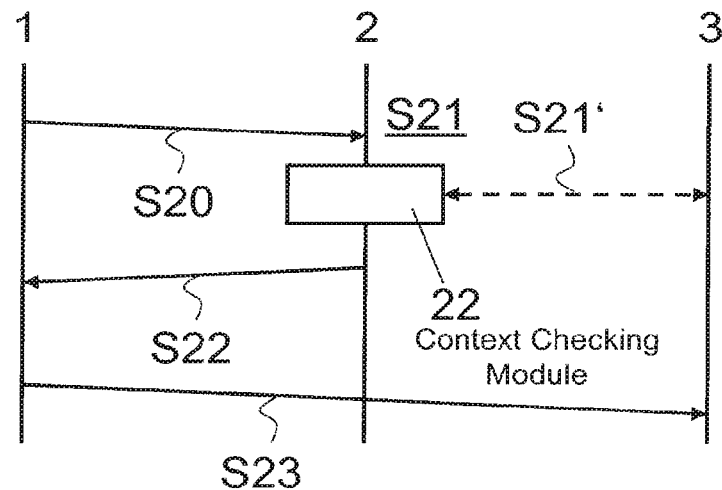
FIG. 3a shows a flow chart illustrating schematically a further possible data exchange during the transmission of context specific data from the data delivery unit to a mobile communication terminal.
Figure 3B:
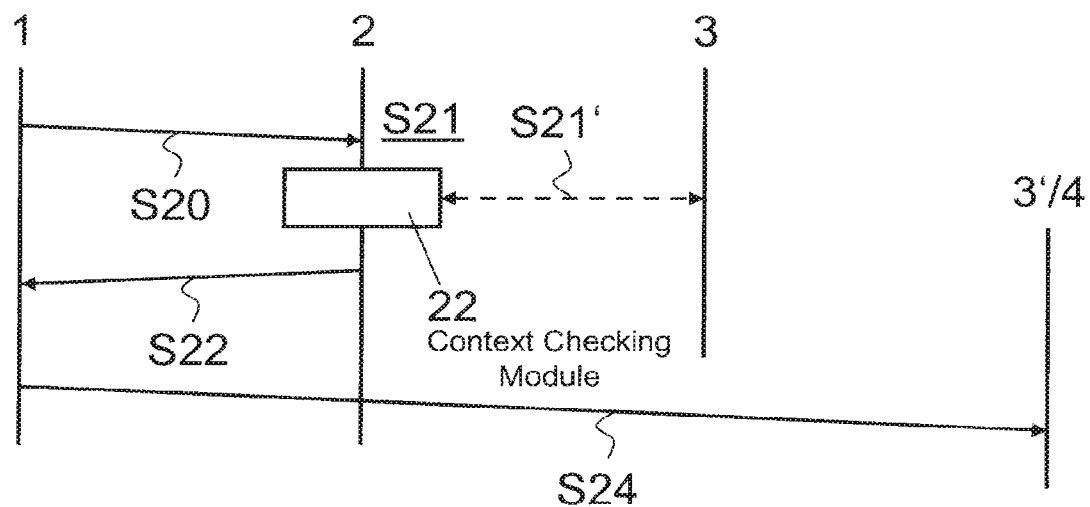
FIG. 3b shows a flow chart illustrating schematically a further possible data exchange during the transmission of context specific data from the data delivery unit to a communication terminal.

As illustrated in FIGS. 3a and 3b, in step S20, the data delivery unit 1 transmits condition data (without associated context-specific data elements) via the communications link 12 to computer system 2. Furthermore, transmitted along with the condition data are assignment data sufficient for assigning context-specific data elements to the condition data. Depending on the embodiment, the assignment data comprise an identification of the respective context-specific data elements or an identification of the condition data. The condition data and the assignment data are received in the computer system 2 by reception module 21 and stored in data store 24. As already explained in the context of step S10, instructions assigned to the condition data can be transmitted along with the condition data from the data delivery unit 1 to the computer system 2. The instructions are received by the reception module 21 and stored in data store 24 assigned to the condition data.

In step S21, the context checking module 22 checks, as explained above in the context of step S11, whether the mobile communication terminal 3 satisfies one or more conditions relevant to the mobile communication terminal 3 and defined by the condition data. As explained above in the context of step S11', if applicable, in step S21', performed are data requests to the mobile communication terminal 3. If at least one condition is satisfied that has associated context-specific data elements that need to be transmitted, the computer system 2 proceeds in step S22. Otherwise, if no condition is satisfied, the context checking module 22 awaits the next checking period or the next event triggering the check.

In step S22, the date transmission module 23 triggers the transmission of the context-specific data elements assigned to the satisfied conditions determined in step S21. The transmission is triggered in that the data transmission module 23 transmits a release instruction to the data delivery unit 1. The release instruction comprises the assignment data for determining the context-specific data elements to be transmitted. Depending on the embodiment, the control module 11 of the data delivery unit 1 proceeds in step S23 (FIG. 3a) or in step S24 (FIG. 3b).

According to the embodiment illustrated in FIG. 3a, in step S23, the control module 11 of the data delivery unit 1 transmits the context-specific data, determined by the assignment data, to the mobile communication terminal 3 that satisfied the conditions. The transmission is carried out directly, from the data delivery unit 1 via the mobile radio network to the mobile communication terminal 3, or indirectly, via the computer system 2, in that the context-specific data elements are transmitted by the data delivery unit 1 for forwarding purposes to the computer system 2.

According to the embodiment illustrated in FIG. 3b, in step S24, the control module 11 of the data delivery unit 1 does not transmit the context-specific data, determined by the assignment data, to the mobile communication terminal 3 that satisfied the conditions, but to the mobile communication terminal 3' or to device 4, which were specified as recipients in an instruction stored assigned to the respective conditions and/or the context-specific data elements. Again, the transmission is carried out directly, from the data delivery unit 1 via the mobile radio network to the mobile communication terminal 3, or indirectly, via the computer system 2, in that the context-specific data elements are transmitted by the data delivery unit 1 for forwarding purposes to the computer system 2. In an embodiment, the transmission of condition data and data elements by the data delivery unit 1 (for example to computer system 2) is tied to specific criteria for the data delivery unit, for example the data delivery unit 1 must first be authenticated and authorized.

As already stated above in the context of steps S12 and S13, there is also the possibility to provide the instructions in such a way that the context-specific elements are delivered to multiple specified recipients, such that step S23 as well as step S24 are carried out. Furthermore, it is possible that instructions are provided in such a way that the context-specific data elements are delivered to one or more specified recipients (e.g. to the mobile communication terminal 3, to device 4, to multiple mobile communication terminals 3', to multiple devices 4, or to multiple mobile communication terminals 3' and multiple devices 4), if one or more communication terminals and/or networking units (e.g. the mobile communication terminal 3 and/or the networking unit 5) satisfy the conditions.

It is also possible to define the instructions such that associated data elements, already delivered, are deleted or changed at the recipient at a later point in time. This later point in time is defined, for example, by a fixed defined point in time or a defined duration of time, or it is tied to specific conditions, defined by condition data. Thereby, it is possible, for example, to update parameter values or to limit in time authorizations and/or keys.

It is also possible to provide instructions that allow the correction of data elements in the data delivery unit 1 or in the computer system 2, if a recipient, e.g. a printer, determines that a transmitted data element, e.g. a printer parameter, is incorrect. For example, such an instruction allows a correction instruction from the recipient for a data element, delivered earlier to this recipient, and corrects the respective data element using a received correction value.

It shall be stated here that the context-specific data elements, which, as described earlier, are transmitted to one or more recipients, may comprise only authorizations or access keys, making it possible for the respective recipient to use access-controlled and/or encrypted data, transmitted to the recipient already prior to the conditions check. In this way, it is possible, for example, that the data delivery unit 1 transmits to the recipient(s) video data, for example encrypted, via a slow GPRS connection, and transmits to the recipient an associated key, only after a payment condition is satisfied.

Concluding, it shall be stated that the proposed computer system and method are not only suited for the transmission of context-specific data via a mobile radio network to mobile communication terminals 3, 3', but that the context-specific data elements can also be transmitted to other network units, particularly to fixed network units, for example dependent on conditions that are satisfied by these other network units. Examples of such network units include electronic terminals connectable to the computer system 2, e.g. via telecommunications network 6, for example other communication terminals, servers, routers, base stations, access points, etc. In this case, the computer system 2 is configured to transmit context-specific data via the telecommunications network 6 to a first one of the network units and comprises a reception module 21 for receiving and storing the condition data, assigned to data elements from the data delivery unit 1, a context checking module 22 for checking whether a second one of the network units satisfies one or more conditions defined by the condition data, and a data transmission module 23 for triggering the transmission of context-specific data elements, assigned to condition data that define a condition satisfied by the second network unit, via the telecommunications network 6 to the first network unit, whereby the first network unit may be a separate network unit, or the first network unit and the second network unit may be one and the same network unit.

The foregoing disclosure of the embodiments of the invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents. Specifically, in the description, the computer program code has been associated with specific software modules, one skilled in the art will understand, however, that the computer program code may be structured differently, without deviating from the scope of the invention. Furthermore, the particular order of the steps set forth in the specification should not be construed as limitations on the claims.

What is claimed is:

1. A system for wireless communication, the system comprising:
   a computer system that transmits context-specific data via a mobile radio network to a first mobile communication terminal external to the computer system, the computer system comprising:
   a receiver configured to receive and store condition data assigned to data elements of a data delivery computer;
   a context checker configured to check whether a second mobile communication terminal, external to the computer system, satisfies one or more conditions defined by the condition data; and
   a data transmitter configured to trigger transmission of context-specific data elements from the computer system via the mobile radio network to the first mobile communication terminal, wherein:
   the receiver is configured to receive a confirmation of condition compliance from the second mobile communication terminal,
   the context checker is configured to check the confirmation of condition compliance and to determine condition data assigned to the confirmation of condition compliance, and
   the data transmitter is configured to trigger the transmission via the mobile radio network to the first mobile communication terminal of the context-specific data elements assigned to the condition data determined.

2. The system of claim 1, wherein the computer system is configured to obtain, from a networking unit of the mobile radio network, current attribute data associated with the second mobile communication terminal, and the context checker is configured to check, based on these current attribute data and respective condition data, whether the second mobile communication terminal satisfies the conditions, wherein the networking unit comprises a home location register (HLR) or a home subscriber system (HSS).

3. The system of claim 1, wherein the context checker is configured to check, based on current attribute data associated with the second mobile communication terminal and respective condition data, whether the second mobile communication terminal satisfies the conditions, these current attribute data comprising at least one of geographic position, network access point, network identifier, network address, network type, subscriber identifier, certificate, password, device type, and device configuration.

4. The system of claim 1, wherein the receiver is configured to receive, from the data delivery computer, the data elements assigned to the condition data and to store the data elements assigned to the condition data, and the data transmitter is configured to transmit the context-specific data elements to the first mobile communication terminal.

5. The system of claim 1, wherein the receiver is configured to receive and store assignment data assigning the condition data to the data elements from the data delivery computer, and the data transmitter is configured to trigger the transmission of the context-specific data elements by transmitting to the data delivery computer a release instruction.

6. The system of claim 1, wherein the data elements comprise at least one data element of operational parameter for the first mobile communication terminal, electronic message, electronic data value and software element for a software application.

7. The system of claim 1, wherein the context checker is configured to check periodically or on the basis of a received message the conditions defined by the condition data.

8. The system of claim 1, wherein the first mobile communication terminal and the second mobile communication terminal are the same mobile communication terminal.

9. The system of claim 1, wherein the data delivery computer is arranged in the computer system.

10. A method for wireless communication, the method comprising:
  transmitting context-specific data from a computer system via a mobile radio network to a first mobile communication terminal, external to the computer system;
  transmitting condition data, assigned to data elements of a data delivery computer, from the data delivery computer unit to the computer system;
  receiving and storing the condition data in the computer system;
  checking in the computer system whether a second mobile communication terminal, external to the computer system, satisfies one or more conditions defined by the condition data; and
  triggering, by the computer system, transmission of context-specific data elements from the computer system via the mobile radio network to the first mobile communication terminal, wherein:
    the second mobile communication terminal transmits a confirmation of condition compliance to the computer system;
    the computer system checks the confirmation of condition compliance and determines condition data assigned to the confirmation of condition compliance; and
    the computer system triggers the transmission via the mobile radio network to the first mobile communication terminal of the context-specific data elements assigned to the condition data determined.

11. The method of claim 10, wherein the computer system obtains, from a networking unit of the mobile radio network, current attribute data associated with the second mobile communication terminal, and the computer system checks, based on these current attribute data and respective condition data, whether the second mobile communication terminal satisfies the conditions, wherein the networking unit comprises a home location register (HLR) or a home subscriber system (HSS).

12. The method of claim 10, wherein the computer system checks, based on current attribute data associated with the second mobile communication terminal and respective condition data, whether the second mobile communication terminal satisfies the conditions, these current attribute data comprising at least one of geographic position, network access point, network identifier, network address, network type, subscriber identifier, certificate, password, device type, and device configuration.

13. The method of claim 10, wherein the data delivery computer transmits to the computer system the data elements assigned to the condition data, the computer system receives and stores the data elements assigned to the condition data, and the computer system transmits the context-specific data elements to the first mobile communication terminal.

14. The method of claim 10, wherein the data delivery computer transmits to the computer system assignment data assigning the condition data to the data elements, the computer system receives and stores the assignment data, and the computer system triggers the transmission of the context-specific data elements by transmitting to the data delivery computer a release instruction.

15. The method of claim 10, wherein the data elements comprise at least one data element of operational parameter for the first mobile communication terminal, electronic message, electronic data value and software element for a software application.

16. The method of claim 10, wherein the computer system checks periodically or on the basis of a received message the conditions defined by the condition data.

17. The method of claim 10, wherein the first mobile communication terminal and the second mobile communication terminal are the same mobile communication terminal.

18. A non-transitory computer-readable medium storing computer-readable instructions thereon, the computer-readable instructions when executed by a computer cause the computer to perform the method comprising: receiving and storing condition data in a computer system, the condition data being assigned to data elements of a data delivery computer; checking whether a second mobile communication terminal, external to the computer system; satisfies one or more conditions defined by the condition data; and triggering transmission of context-specific data elements from the computer system via the mobile radio network to the first mobile communication terminal, external to the computer system, wherein: the second mobile communication terminal transmits a confirmation of condition compliance to the computer system; the computer system checks the confirmation of condition compliance and determines condition data assigned to the confirmation of condition compliance; and the computer system triggers the transmission via the mobile radio network to the first mobile communication terminal of the context-specific data elements assigned to the condition data determined.

19. A system for wireless communication, the system comprising:
  a computer system that transmits context-specific data via a mobile radio network to a first mobile communication terminal external to the computer system, the computer system comprising:
    a receiver configured to receive and store condition data assigned to data elements of a data delivery computer;
    a context checker configured to check whether a second mobile communication terminal, external to the computer system, satisfies one or more conditions defined by the condition data; and
    a data transmitter configured to trigger transmission of context-specific data elements from the computer system via the mobile radio network to the first mobile communication terminal, wherein:

the receiver is configured to receive and store instructions, which are assigned to the condition data and/or the context-specific data elements, and the data transmitter is configured to trigger the transmission of the context-specific data elements according to the respective instructions, whereby different ones of the context-specific data elements are to be transmitted to the first mobile communication terminal and/or to another device.

20. The system of claim 19, wherein the computer system is configured to obtain, from a networking unit of the mobile radio network, current attribute data associated with the second mobile communication terminal, and the context checker is configured to check, based on these current attribute data and respective condition data, whether the second mobile communication terminal satisfies the conditions, wherein the networking unit comprises a home location register (HLR) or a home subscriber system (HSS).

21. The system of claim 19, wherein the context checker is configured to check, based on current attribute data associated with the second mobile communication terminal and respective condition data, whether the second mobile communication terminal satisfies the conditions, these current attribute data comprising at least one of geographic position, network access point, network identifier, network address, network type, subscriber identifier, certificate, password, device type, and device configuration.

22. The system of claim 19, wherein the receiver is configured to receive, from the data delivery computer, the data elements assigned to the condition data and to store the data elements assigned to the condition data, and the data transmitter is configured to transmit the context-specific data elements to the first mobile communication terminal.

23. The system of claim 19, wherein the receiver is configured to receive and store assignment data assigning the condition data to the data elements from the data delivery computer, and the data transmitter is configured to trigger the transmission of the context-specific data elements by transmitting to the data delivery computer a release instruction.

24. The system of claim 19, wherein the data elements comprise at least one data element of operational parameter for the first mobile communication terminal, electronic message, electronic data value and software element for a software application.

25. The system of claim 19, wherein the context checker is configured to check periodically or on the basis of a received message the conditions defined by the condition data.

26. The system of claim 19, wherein the first mobile communication terminal and the second mobile communication terminal are the same mobile communication terminal.

27. The system of claim 19, wherein the data delivery computer unit is arranged in the computer system.

28. A method for wireless communication, the method comprising:
transmitting context-specific data from a computer system via a mobile radio network to a first mobile communication terminal, external to the computer system;
transmitting condition data, assigned to data elements of a data delivery computer, from the data delivery computer to the computer system;
receiving and storing the condition data in the computer system;
checking in the computer system whether a second mobile communication terminal, external to the computer system, satisfies one or more conditions defined by the condition data; and
triggering, by the computer system, transmission of context-specific data elements from the computer system via the mobile radio network to the first mobile communication terminal, wherein:
the transmission of the context-specific data elements is triggered according to instructions, which are assigned to the condition data and/or the context-specific data elements, whereby different ones of the context-specific data elements are to be transmitted to the first mobile communication terminal and/or to another device.

29. The method of claim 28, wherein the computer system obtains, from a networking unit of the mobile radio network, current attribute data associated with the second mobile communication terminal, and the computer system checks, based on these current attribute data and respective condition data, whether the second mobile communication terminal satisfies the conditions, wherein the networking unit comprises a home location register (HLR) or a home subscriber system (HSS).

30. The method of claim 28, wherein the computer system checks, based on current attribute data associated with the second mobile communication terminal and respective condition data, whether the second mobile communication terminal satisfies the conditions, these current attribute data comprising at least one of geographic position, network access point, network identifier, network address, network type, subscriber identifier, certificate, password, device type, and device configuration.

31. The method of claim 28, wherein the data delivery computer transmits to the computer system the data elements assigned to the condition data, the computer system receives and stores the data elements assigned to the condition data, and the computer system transmits the context-specific data elements to the first mobile communication terminal.

32. The method of claim 28, wherein the data delivery computer transmits to the computer system assignment data assigning the condition data to the data elements, the computer system receives and stores the assignment data, and the computer system triggers the transmission of the context-specific data elements by transmitting to the data delivery computer a release instruction.

33. The method of claim 28, wherein the data elements comprise at least one data element of operational parameter for the first mobile communication terminal, electronic message, electronic data value and software element for a software application.

34. The method of claim 28, wherein the transmission of the context-specific data elements is triggered according to instructions, which are assigned to the condition data and/or the context-specific data elements, whereby different ones of the context-specific data elements are to be transmitted to the first mobile communication terminal and/or to another device.

35. The method of claim 28, wherein the computer system checks periodically or on the basis of a received message the conditions defined by the condition data.

36. The method of claim 28, wherein the first mobile communication terminal and the second mobile communication terminal are the same mobile communication terminal.

* * * * *